W. ALTICK.
Stalk-Puller.
No 56,509. Patented July 24, 1866.
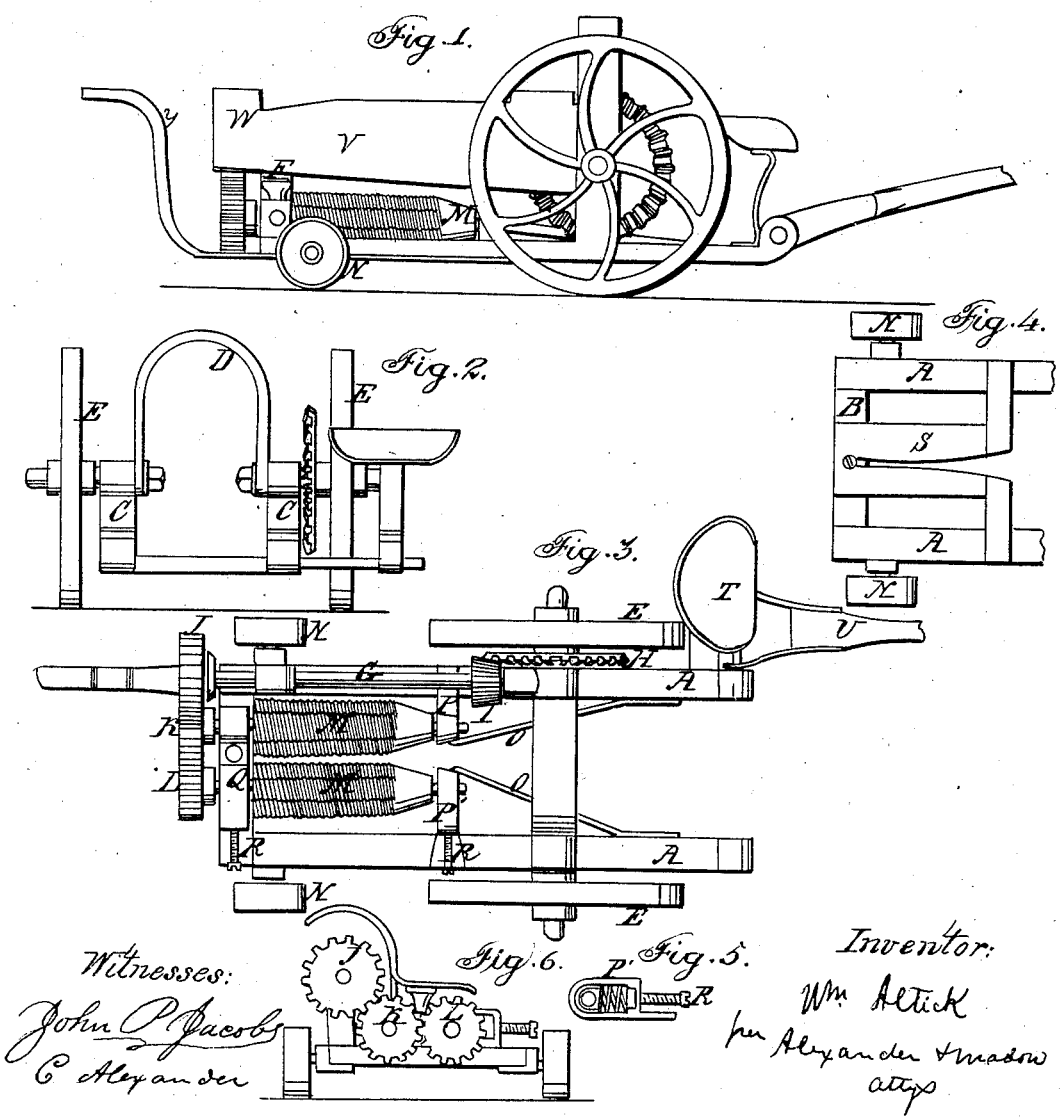

UNITED STATES PATENT OFFICE.

WM. ALTICK, OF DAYTON, OHIO.

IMPROVEMENT IN MACHINES FOR PULLING UP OLD COTTON AND CORN STALKS.

Specification forming part of Letters Patent No. 56,509, dated July 24, 1866.

*To all whom it may concern:*

Be it known that I, WM. ALTICK, of Dayton, in the county of Montgomery and State of Ohio, have invented certain new and useful Improvements in Machines for Pulling Stalks; and I do hereby declare that the following is a full, clear, and exact description of the same, reference being had to the accompanying drawings and to the letters of reference marked thereon.

In the annexed drawings, making part of this specification, A A represent two stout metallic bars, which are placed parallel to each other, and from two and a half to three feet apart, or at any required distance. These bars are firmly secured together at their rear ends by means of a metallic cross-bar, B.

Forming a portion of or erected upon the bars A, near their forward ends, are two standards, C C, and through the upper ends of these standards short axles pass, upon which the large wheels E E are secured. A metallic bow, D, is firmly secured at its ends upon the inner ends of the short axles by means of suitable nuts. This bow or arch serves to bind the forward ends of the bars A A together, while it rises sufficiently at its center to pass over the stalks which the machine is intended to pull.

G represents a shaft which lies above one of the bars A, having its forward bearing in a hub formed upon one of the forward supports or standards to receive it, while its other bearing is in a standard erected or forming a portion of one of the bars A, near its rear end. This shaft has two gear-wheels upon it, one wheel, I, being a bevel-wheel and gearing into a bevel-wheel, H, which is secured by the side of one of the wheels E upon its short axle.

M M represent two rollers, which lie horizontally and parallel to each other, their forward ends tapering, as shown, and diverging from each other. The forward ends of these rollers beyond the taper have formed upon them journals which have suitable boxes for bearings in clips P P', which are secured to the bars A A. In one of these clips P' is a sliding journal-box for the end of one of the rollers, and this sliding box is operated upon by a spring and thumb-screw. The other ends of these rollers M M are provided with short shafts, upon the ends of which are gear-wheels L and K, and into one of which works the gear-wheel J on the end of the shaft G, for giving motion to said rollers M. These shafts on the rear ends of the rollers form journals between the rollers and the wheels on their ends, and these journals rest in boxes in a metallic bar which is bolted upon top of the cross-bar B. One of the journals is in a sliding journal-box, said box being regulated by a spring and set-screw similar to the one previously described.

It will be seen that one of these rollers, being provided with sliding journal-boxes for its journals at each end, is allowed to adjust itself to the other and to yield or separate from it when stalks of different sizes pass between the rollers requiring it. The rollers are corrugated and roughened on their periphery, so that they will take hold of the stalks and hold them firmly.

The rear ends of the bars A are supported upon the small wheels N, which are secured upon short axles bolted to said bars.

V and W represent shields, V being a shield setting edgewise and vertically over one of the rollers, to prevent the stalks, after they have passed up between the rollers, from going only on one side of the machine. W is a shield for protecting the wheels J, K, and L from being injured by trash, &c., falling upon them.

S represents a slotted metallic plate secured to the bars A under the rollers, as shown in Fig. 4, its slot being made the shape of the space or opening between the rollers.

O O represent metallic straps, which are secured at one end to the bars A, near their forward ends, and at their other end to the clips P P', as represented. These straps answer the purpose of guides for directing the stalks between the rollers.

The object of this machine is to pull up cotton-stalks, corn-stalks, or any other stalk of this description from drills, &c.

As the machine passes along through the field the rollers pass over the row or drill, and the stalks being caught between the rollers, which revolve (as the machine moves) upward, pulling them up and throwing them off to one side of the machine. In order to insure more fully the stalks passing to one side, the roller on the opposite side is set a very little higher in its bearings.

Having thus fully described my invention, what I claim as new, and desire to secure by Letters Patent, is—

1. The combination of the two rollers M M, when one is made rigid and the other flexible or yielding in its bearings, substantially as and for the purpose specified.

2. The arch or bow D, when used with the frame-pieces or bars A A and the rollers M M, as and for the purpose herein specified.

3. The arrangement of the shield V with the arch D and rollers M M, substantially as and for the purpose set forth.

4. The plate S, constructed as set forth and arranged under the rollers, as and for the purpose described.

As evidence that I claim the foregoing I have hereunto set my hand in the presence of two witnesses.

WM. ALTICK.

Witnesses:
 THOS. D. MITCHELL,
 DAVID VALENTINE.